United States Patent [19]
Smith et al.

[11] Patent Number: 5,564,770
[45] Date of Patent: Oct. 15, 1996

[54] SNOW SCREEN

[76] Inventors: Patrick A. Smith; Sonia Smith, both of 1430 Freeport Loop, Apt. 6F, Brooklyn, N.Y. 11239

[21] Appl. No.: 514,825
[22] Filed: Aug. 14, 1995
[51] Int. Cl.$^6$ ........................................ B60J 1/20
[52] U.S. Cl. ............... 296/95.1; 150/168; 160/24; 160/370.22; 296/98
[58] Field of Search ................ 296/95.1, 136, 296/98; 150/166, 168; 160/370.22, 23.1, 24, DIG. 3

[56] References Cited

U.S. PATENT DOCUMENTS

| | | | |
|---|---|---|---|
| 3,454,300 | 7/1969 | Pugsley et al. | 296/95.1 |
| 4,815,515 | 3/1989 | Lee | 160/23.1 |

FOREIGN PATENT DOCUMENTS

| | | | |
|---|---|---|---|
| 1216983 | 4/1960 | France | 296/95.1 |
| 1157001 | 2/1961 | Germany | 160/24 |

*Primary Examiner*—David M. Mitchell
*Assistant Examiner*—Kia M. Robinson

[57] ABSTRACT

The vehicular windshield cover of the invention includes a first tubular housing arranged to have extensible or retracted therefrom a fluid impermeable flexible web that extends to a second housing having a cylindrical concave surface arranged to accommodate the first cylindrical housing during a nested configuration when the web is wound within the first cylindrical housing. The web securedg about an axle within the first cylindrical housing is arranged such that the axle is fixedly secured to a cap member that iS rotatably mounted to the cylindrical housing, such that rotation of the cap relative to the housing permits fueling of the web within that housing. Various structure to secure the housings to the Windshield is arranged to include suction cups, straps, and the like.

4 Claims, 3 Drawing Sheets

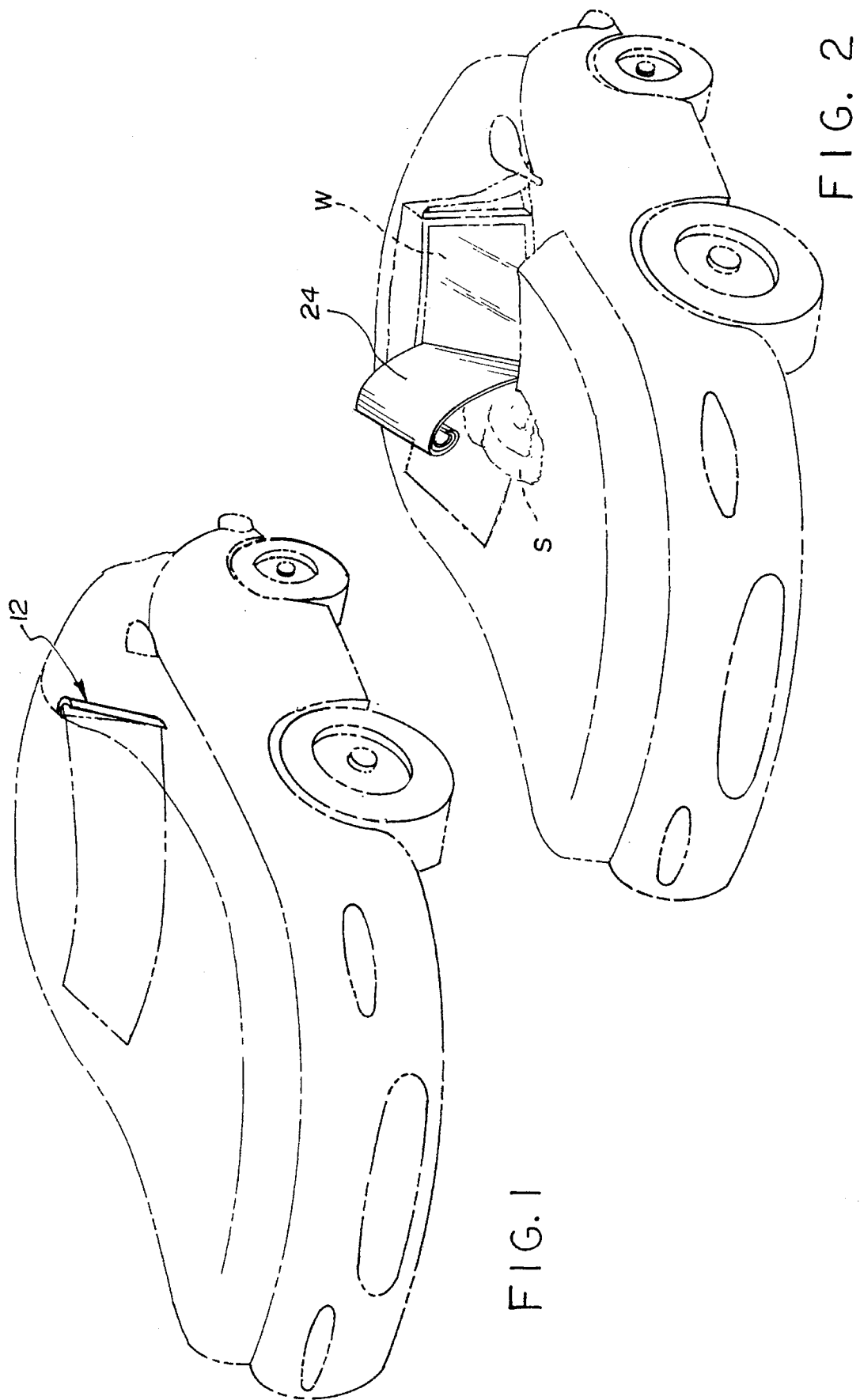

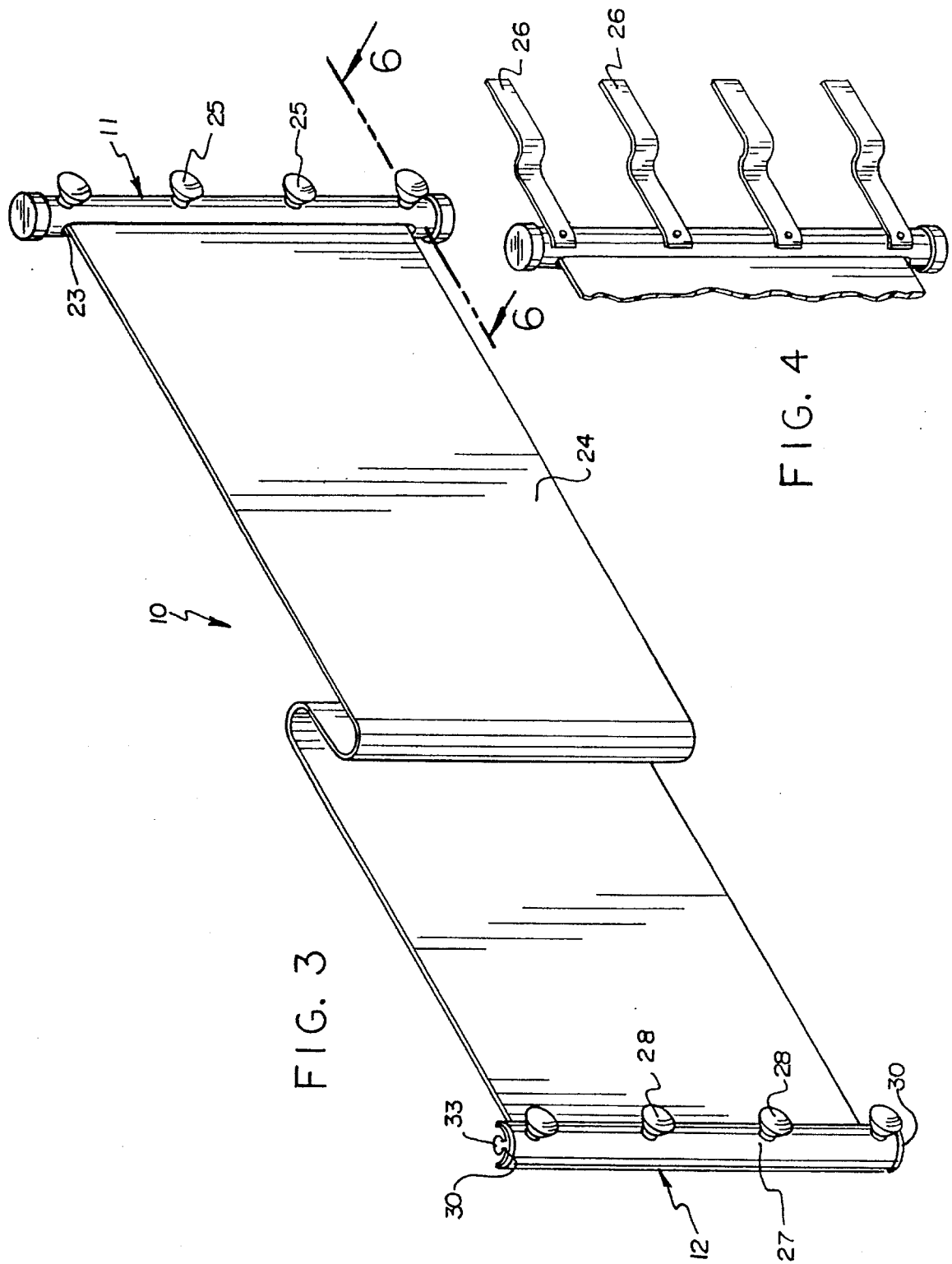

SNOW SCREEN

TECHNICAL FIELD

The field of invention relates to windshield cover structure, and more particularly to a vehicular windshield cover (snow screen) arranged for the ease of positioning onto a vehicle windshield to afford protection of the vehicle windshield relative to various precipitation, dust, and the like, with the invention directed to ease of interfolding into a nested configuration during periods of non-use and storage.

BACKGROUND OF THE INVENTION

Prior art windshield covering structure is indicated by the U.S. Pat. Nos. 3,964,780; 4,399,347; 4,973,098; 5,123,468; 5,211,438; 5,290,0985; and U.S. Pat. No. Des. 331,211.

SUMMARY OF THE INVENTION

The vehicular windshield cover of the invention includes a first tubular housing arranged to have extensible or retracted therefrom a fluid impermeable flexible web that extends to a second housing having a cylindrical concave surface arranged to accommodate the first cylindrical housing during a nested configuration when the web is wound within the first cylindrical housing. The web secured about an axle within the first cylindrical housing is arranged such that that axle is fixedly secured to a cap member that is rotatably mounted to the cylindrical housing, such that rotation of the cap relative to the housing permits fueling of the web within that housing. Various structure to secure the housings to the windshield is arranged to include suction cups, straps, and the like.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective illustration of the invention secured relative to a vehicular windshield.

FIG. 2 is a perspective illustration of the invention arranged to be lifted tothereby remove various precipitation and the like directed onto the web of the invention.

FIG. 3 is a perspective illustration of the invention in an extended configuration.

FIG. 4 is an enlarged, partial perspective illustration of the first cylindrical housing having securement straps in lieu of suction cup members.

DESCRIPTION OF THE PREFERRED EMBODIMENT

Figure 6:
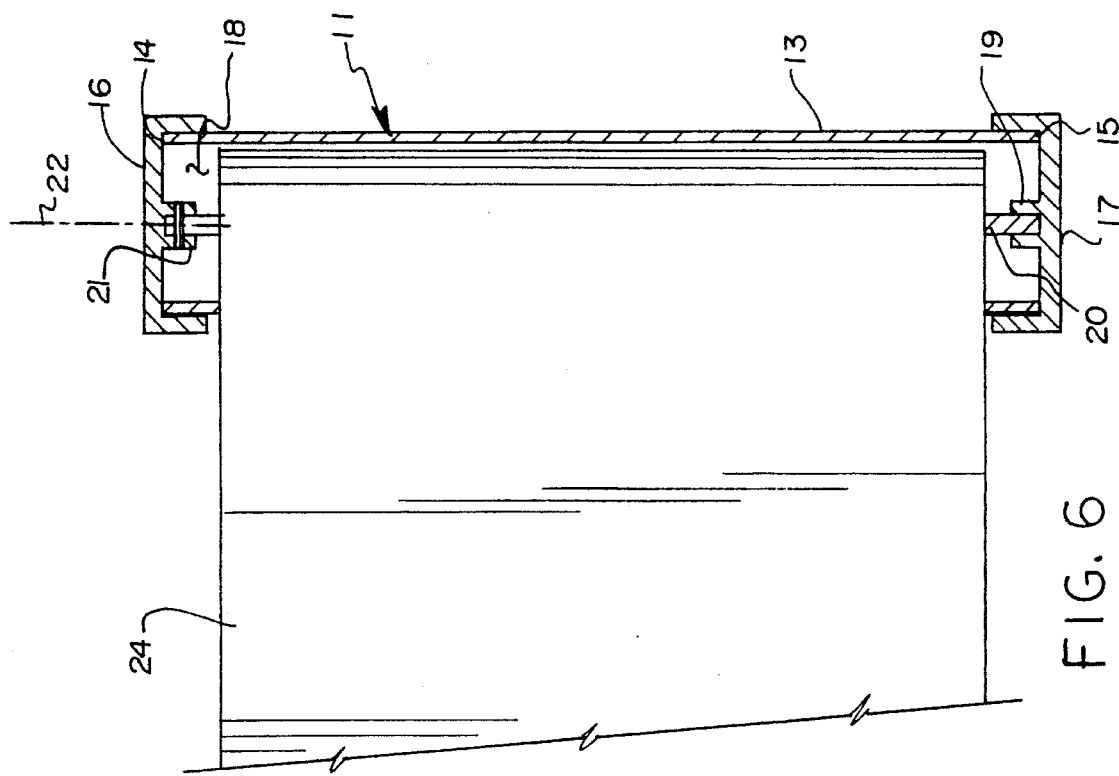
FIG. 6 is an enlarged cross-sectional illustration, taken along the lines 6—6 of FIG. 3 as indicated.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The vehicular windshield cover 10 of the invention comprises a first tubular housing 11 cooperative, with a second tubular housing 12, having extensibly retracted therebetween a flexible web formed of a fluid impermeable material. The flexible web 24 as illustrated FIG. 3 for example is secured at each of its ends to a respective one of the first and second tubular housings 11 and 12. The flexible web to this end may be formed of a polymeric type material, but any suitable flexible material may be employed.

Figure 5:
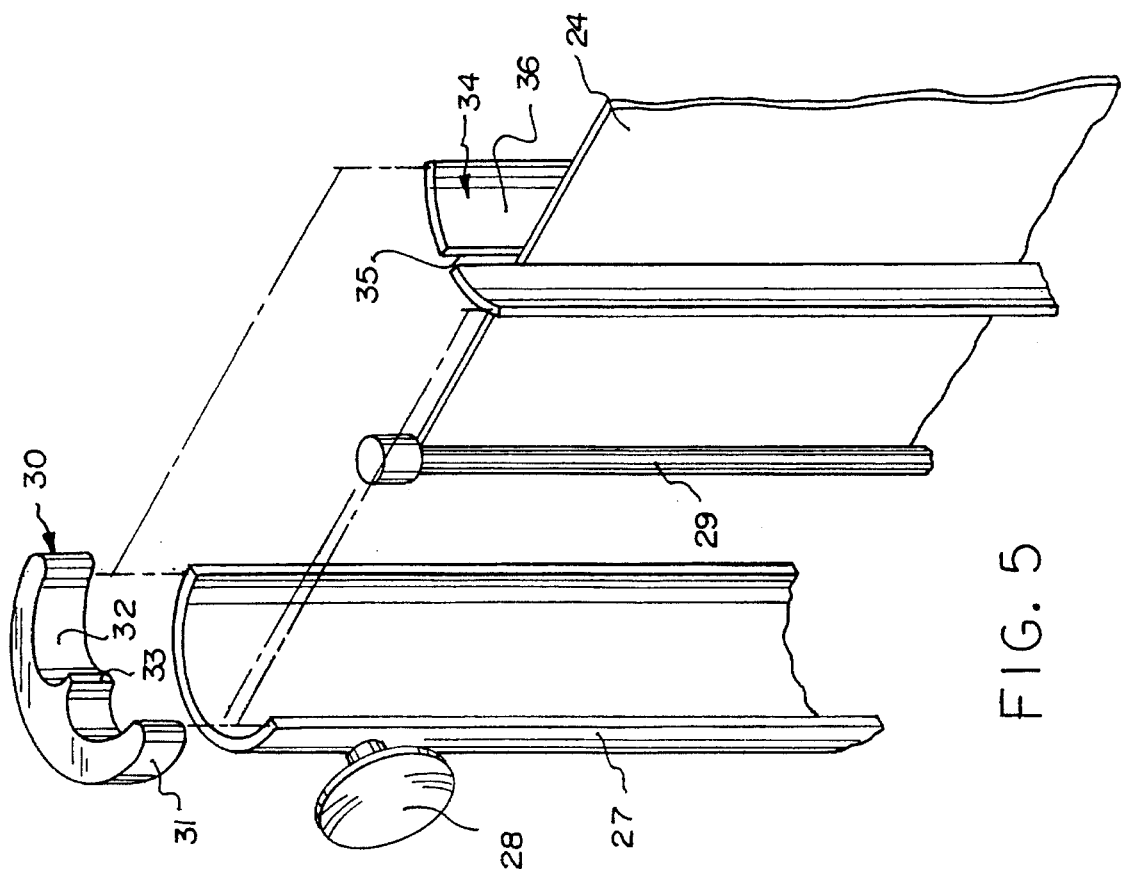
FIG. 5 is a perspective, partial view of the second cylindrical housing in exploded illustration.

The first tubular housing 11 includes a cylindrical first body 13 having a first end 14 spaced from a second end 15, such that a first cap 16 is rotatably secured onto the first end 14, with a second cap 17 fixedly secured to the isecond end 15. To this end, a first body cavity 18 is defined within the first body 13 between the first and second caps 16 and 17 respectively. The second cap 17 has positioned thereto a second cap socket 19 in a facing relationship relative to the first body cavity 18 and coaxially aligned along the first housing axis 22 (see FIG. 6). A first axle 20 is rotatably received within the second cap socket at its first end, with the cap second end fixedly secured to a first cap socket 21 that is also in a facing relationship relative to the first body cavity 18. The first cap socket 21 coaxially aligned along the axis 22 is such that rotation of the first cap 16 relative to the first body 13 permits furling of the flexible web 24 about the first axle 20, as that web 24 is slidably received through a first body slot 23 oriented parallel to the axis 22. It should be noted that the first body slot 23 is of predetermined first length, with the second housing 12 of a second length less than or equal to the first length, such that the second housing may complementarily accomodate the first housing 11 within a concave guide web exterior surface 36, such as illustrated in FIG. 5, when the web 24 is completely retracted within the first body cavity 18 and the second housing 12 is arranged to contiguously engage the first tubular housing 11.

The FIG. 4 indicates the use of straps 26 utilized in lieu of the first suction cups 25 secured onto the first housing 11. The suction cupsarearranged for fastening to the vehicular windshield or the vehicular body while the straps 26 may be positioned within the vehicle and captured by the vehicle door as the straps are directed between the door and the body thereby securing the straps. It is also set forth that the straps may be utilized in addition to the suction cups 25, both for the first housing 11 and the second housing 12 that employs a series of second suction cups 28, as illustrated in FIG. 3, for the same purpose. The second housing 12 is formed with to semi-cylindrical second body 27, having second body cap members 30 secured at each end of the second bodytoEach of the second body cap members includes a convex first side wall 31 complementarily receiving a respective end of the second body 27. The construction of each of the cap members 30 also includes a concave second side wall 32 to engage a respective end of an associated concave, rigid, semi-cylindrical guide web 34, as illustrated in FIG. 5 for example. The guide web 34 includes a guide web slot 35 to direct the web 24 therethrough, that in turn is securetoat its second end to a second axle 29 that is engaged at each of its ends to a respective one of the second body cap members 30. Each of the second body cap members 30, and more particularly a second side wall 32, has a resilient rib 33 projecting therefrom. Each resilient rib of the caps 30 is arranged for reception within the first body slot 23 to thereby secure the second housing to the first housing when the second housing is nested against the first housing in a relationship for storage and transport of the organization during periods of non-use.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A vehicular windshield cover, comprising, a first tubular housing and a second tubular housing, the first tubular housing having a cylindrical first body symmetrically oriented about a first axis, with the first body having a first body first end and a first body second end, with a first cap rotatably secured to the first body first end and a second cap fixedly secured to the first body second end, a first axle first end secured fixedly to the first cap, and the first axle having a first axle second end rotatably mounted to the second cap, with the first axle symmetrically oriented along the first axis, and a flexible web having a web first end secured to the first axle, and a web second end at a second axle, with the second axle secured to the web send end, and the second axle positioned within the second tubular housing and enclosed by the second tubular housing;

the second housing having an elongate, semi-cylindrical second body and a plurality of second body cap members, with each of said second body cap members having a convex first side wall receiving one endtof said second body, and each of said body cap members having aiconcave second side wall, the concave second side wall having secured therewithin each further end of a rigid semi-cylindrical guide web, an exterior surface of said semi-cylindrical guide web having a guide web exterior surface, and the guide web having a guide web slot directed therethrough.

2. A windshield cover as set forth in claim 1 wherein the first housing includes first fastening means for selective securement of the first housing to an associate vehicle, and the second housing having second fastening means for securement of the second housing to said associated vehicle.

3. A windshield cover as set forth in claim 2 wherein said first fastening means and said second fastening means each comprise suction cups.

4. A windshield cover as set forth in claim 2 wherein said first fastening means and said second fastening means comprises at least one strap member.

* * * * *